E. A. RÉMÉZY.
AUTOMOBILE SLEDGE.
APPLICATION FILED AUG. 28, 1911.

1,066,438.

Patented July 1, 1913.
3 SHEETS—SHEET 3.

WITNESSES
William Abbs
L. H. Grote

INVENTOR
Edmond A. Rémézy
by his attorneys
Howson and Howson

UNITED STATES PATENT OFFICE.

EDMOND AUGUSTIN RÉMÉZY, OF L'ISLE-SUR-SORGUE, FRANCE.

AUTOMOBILE SLEDGE.

1,066,438.

Specification of Letters Patent.

Patented July 1, 1913.

Application filed August 28, 1911. Serial No. 646,540.

*To all whom it may concern:*

Be it known that I, EDMOND AUGUSTIN RÉMÉZY, a citizen of the Republic of France, and a resident of L'Isle-sur-Sorgue, Department of Vaucluse, France, have invented certain new and useful Improvements in Automobile Sledges, of which the following is a specification.

This invention relates to an automobile sledge and has for its object one which is characterized by propellers constituted by a drum or cylindrical core with spherical or spindle shaped extremities, provided upon its outer surface with helicoidal projections of special form.

Attempts have already been made to utilize propeller screws (Archimedean screws) for the propulsion of automobile sledges but it has been found that this type of propeller was only suitable for running on very hard frozen ground and did not furnish good results when running in snow. It will be understood that in snow which is not consistent these propellers can obtain no hold and therefore cannot effect an advance of the vehicle.

The propellers of the automobile sledge as contemplated by the present invention permits of insuring propulsion on any kind of ground. The cores or drums of which they are constituted exert a pressure upon the snow rendering it compact and of sufficient consistency for the helical projections with which these drums are provided to cause the vehicle to advance in bearing upon the snow thus compressed.

Figure 1:
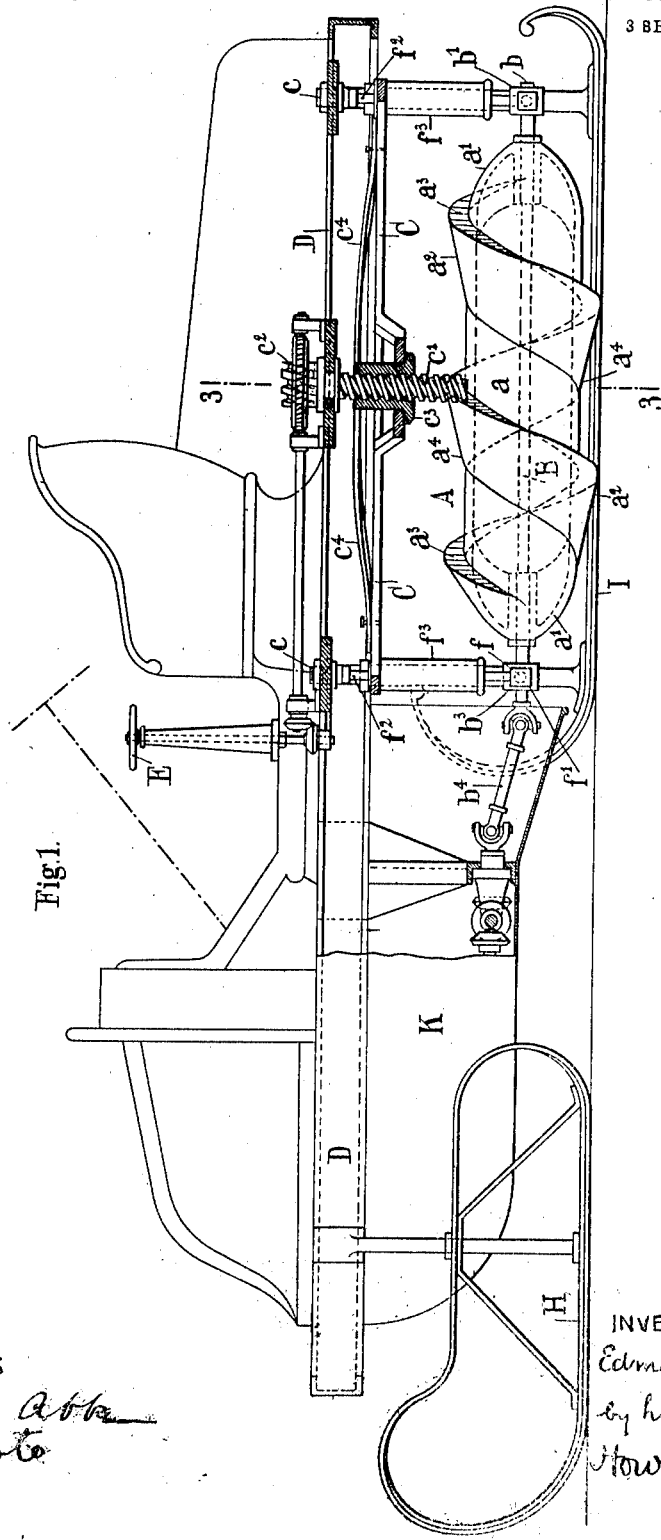
Figure 2:
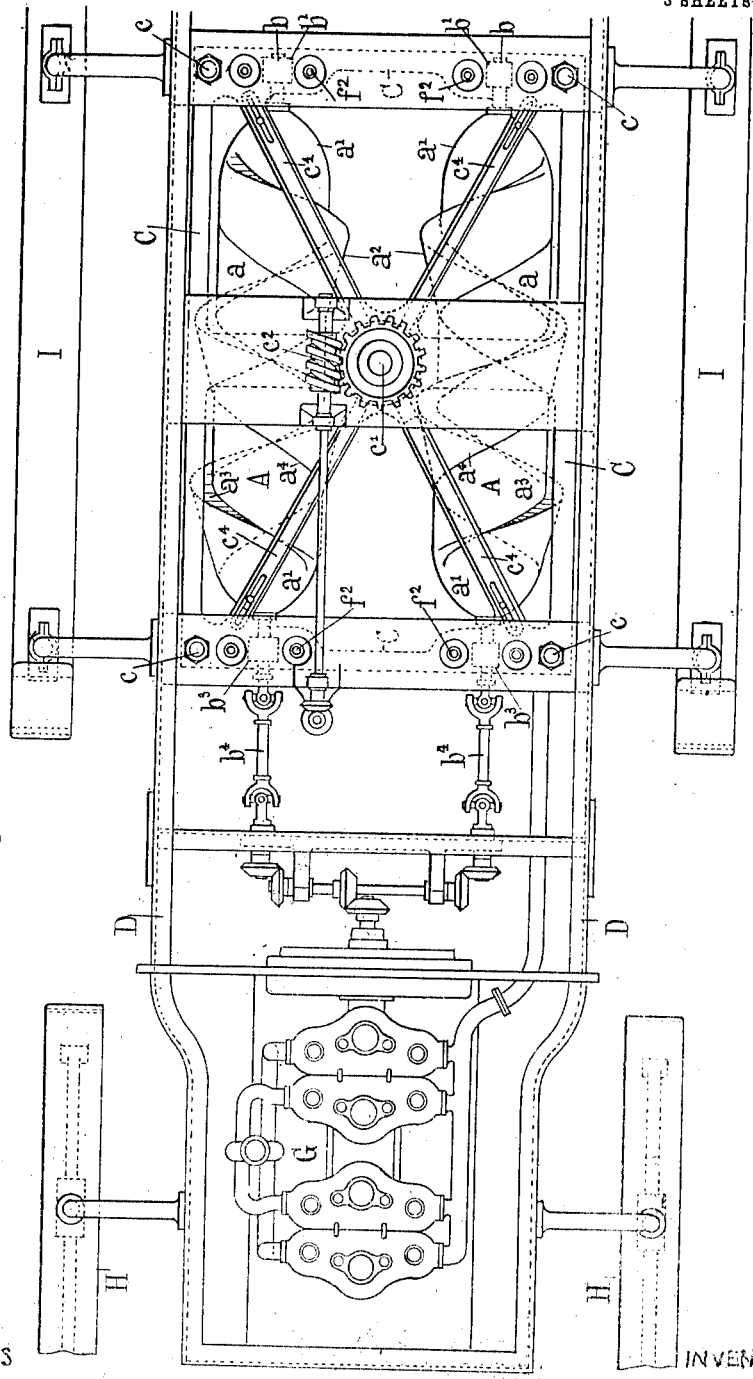
Figure 3:
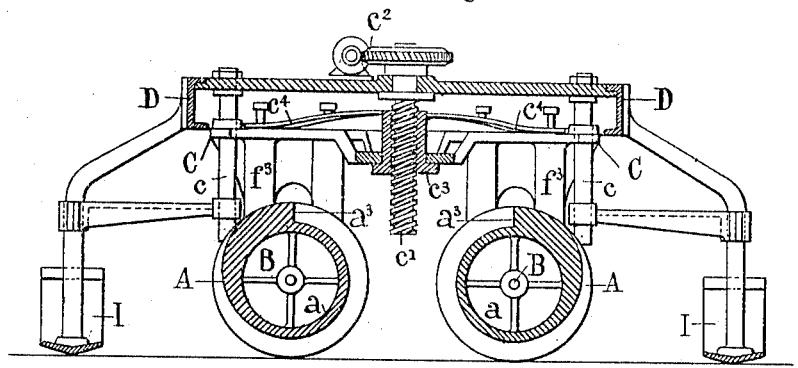
Figure 4:
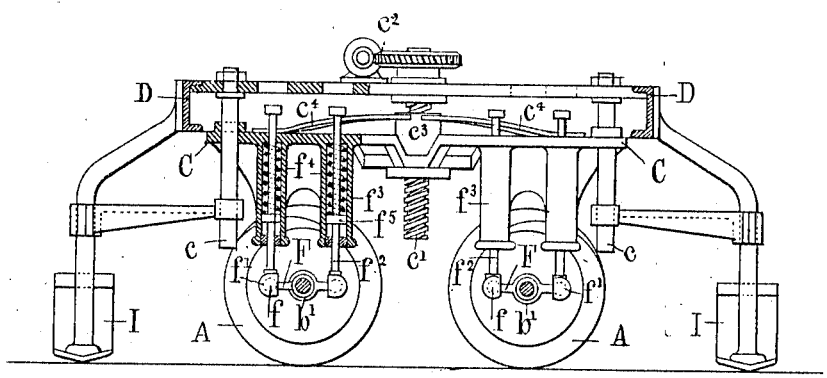
Figure 5:
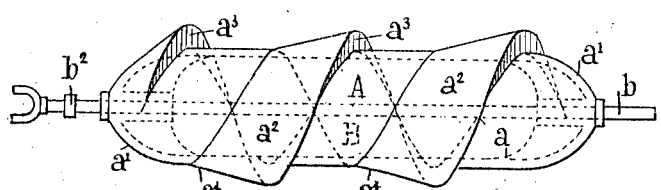

The invention is illustrated by way of example in the accompanying drawing, in which:

Figure 1 is an elevation partly in section. Fig. 2 is a corresponding plan, the body here being removed in order to show the details of the mechanism. Fig. 3 is a section on the line 3—3 in Fig. 1. Fig. 4 is a rear elevation partly in section. Fig. 5 represents a detached propeller.

The propellers A are formed by a cylindrical core $a$ terminating in spindle-shaped portions $a'$ and provided with helicoidal projections $a^2$ which are constituted toward the rear by a helicoidal surface $a^3$ (propeller surface) which is substantially normal to the generating lines of the core and toward the front by a gradual incline $a^4$ the form of which permits of throwing off the snow. This surface, which is generated by a straight line in the example illustrated, may be generated by a curve joining the cylinder. These helicoidal projections are carried in the opposite direction upon each of the cores which rotate in opposite directions around their axes B in such a manner as to balance the efforts. These axes B are constituted at the rear by a cylindrical portion $b$ journaled in a ball bearing $b'$ comprising in front a bearing collar $b^2$ held in a ball bearing $b^3$; their opposite movements are produced by means of universal-joint-shafts $b^4$ operated by the motor by means of a bevel pinion or other suitable transmission.

According to the consistency of the snow it is necessary that the propellers should penetrate the same to such an extent as to exert upon it a greater or less compression. To this end the propellers are mounted in a manner which will hereinafter be described upon a false chassis C able to slide vertically in guides $c$ integral with the chassis D of the vehicle; a screw $c'$ driven for example through a worm gear $c^2$ operated by means of a hand wheel E arranged within reach of the driver when rotating in its nut $c^3$ raises or lowers the false chassis C and consequently the propellers. In order to provide for a certain degree of elasticity in the connection between the false chassis C and the chassis D the nut $c^3$ is capable of longitudinal displacement without rotating relatively to the false chassis C which is pressed upon vigorously by springs $c^4$.

It is indispensable when the propellers A encounter inequalities in the ground that they should be able to incline and move in a vertical plane absolutely independently of each other. A construction enabling this result to be attained is illustrated by way of example. The ball bearings $b'$ and $b^3$ are mounted in parts F rockably mounted by means of ball and socket joints $f$ in supports $f'$, the rods $f^2$ of which slide in tubes $f^3$ integral with the false chassis C; springs $f^4$ of suitable resiliency bear at one end on the false chassis C and at the other end upon the collars $f^5$ of the rods $f^2$ and yield when one of the propellers encounters an inequality in the surface of the ground being traversed.

The chassis D which supports the motor G and the body work is mounted in the ordinary manner upon skates or runners H and I; the parts are protected by means of a gear case K a portion of which is shown in the drawing as removed.

When traveling on ice or on frozen ground the depth of the propellers is regulated by means of the hand wheel E in such a manner that only the ridge of the helicoidal projections acts upon the surface of the ground. On snow covered ground the propellers are lowered until the cylindrical cores compress the snow sufficiently by the pressure that they exert and impart to it such a consistency that the propelling helicoidal surfaces $a^3$ cause the vehicle to advance. The inequalities of the ground encountered do not in any way affect the running of the apparatus owing to the fact that the movements of the propellers are independent of each other.

It will be understood that the invention is not strictly limited to the constructional details described above which are given by way of example only. The propellers may be of hollow metal or of wood reinforced by metal and comprise a variable number of convolutions.

What I claim and desire to secure by Letters Patent of the United States is:—

1. An automobile sledge comprising as propelling means a longitudinally disposed drum coned at its front end and provided throughout the major portion of its length with a helicoidal projection substantially wedge-shaped in cross section with the incline of the wedge forwardly directed and substantially merging at its forward edge with the surface of the drum and the rear or propeller face of said projection having a development substantially normal to the generating lines of the drum axis.

2. An automobile sledge comprising as propelling means, a longitudinally disposed drum and a helicoidal projection extending substantially the length of the latter, the peripheral surface of said projection being forwardly inclined toward the axis of the drum, in combination with a main chassis, runners supporting the same and a false chassis, and means for mounting said propeller means on the latter, substantially as described.

3. An automobile sledge comprising as propelling means, a longitudinally disposed drum and a helicoidal projection extending substantially the length of the latter, the peripheral surface of said projection being forwardly inclined toward the axis of the drum, in combination with a main chassis, runners supporting the same and a false chassis, and means for mounting said propeller means on the latter, together with means for vertically regulating the main and false chassis with relation to each other.

4. An automobile sledge comprising, as propelling means, a pair of longitudinally disposed drums, helicoidal projections extending substantially the length of each of said drums and oppositely arranged thereon, the peripheral surfaces of said projections being forwardly inclined toward the axis of the drum, in combination with a main chassis and runners for supporting the same together with a secondary chassis connected with vertical adjustability to the main chassis and independent mountings for said drums thereon whereby said drums are separately displaceable to accommodate themselves individually to the unevenness of the surface on which they are traveling, substantially as described.

5. An automobile sledge comprising a main chassis and runners supporting the same, in combination with a false chassis and longitudinally arranged propeller means mounted on said false chassis for driving said sledge, a vertically adjustable connection between said false and main chassis, and a flexible connection between said propeller and false chassis, said propeller means comprising a longitudinally disposed drum coned at its front end and provided with a helicoidal projection extending substantially the length of the drum, the peripheral surface of said projection being forwardly inclined toward the axis of the drum and the rear or propeller face of said projection having a development substantially normal to the generating lines of the drum, substantially as described.

In testimony whereof I have signed my name to this specification, in the presence of two subscribing witnesses.

EDMOND AUGUSTIN RÉMÉZY.

Witnesses:
 CUYENEDEUTOWN,
 LEOPOLD SERRET.